Feb. 24, 1970   K. L. BRINKMAN ET AL   3,497,697
LOCAL OSCILLATOR REFERENCE TRACKING SYSTEM (LORTS)
Filed Nov. 1, 1967   4 Sheets-Sheet 1
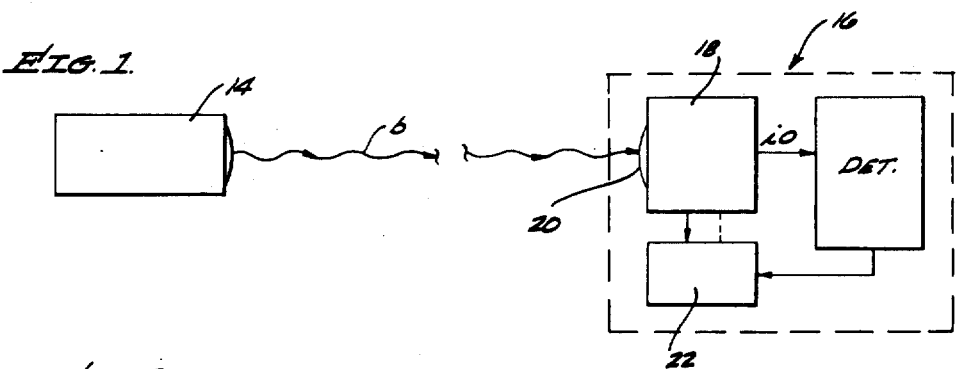
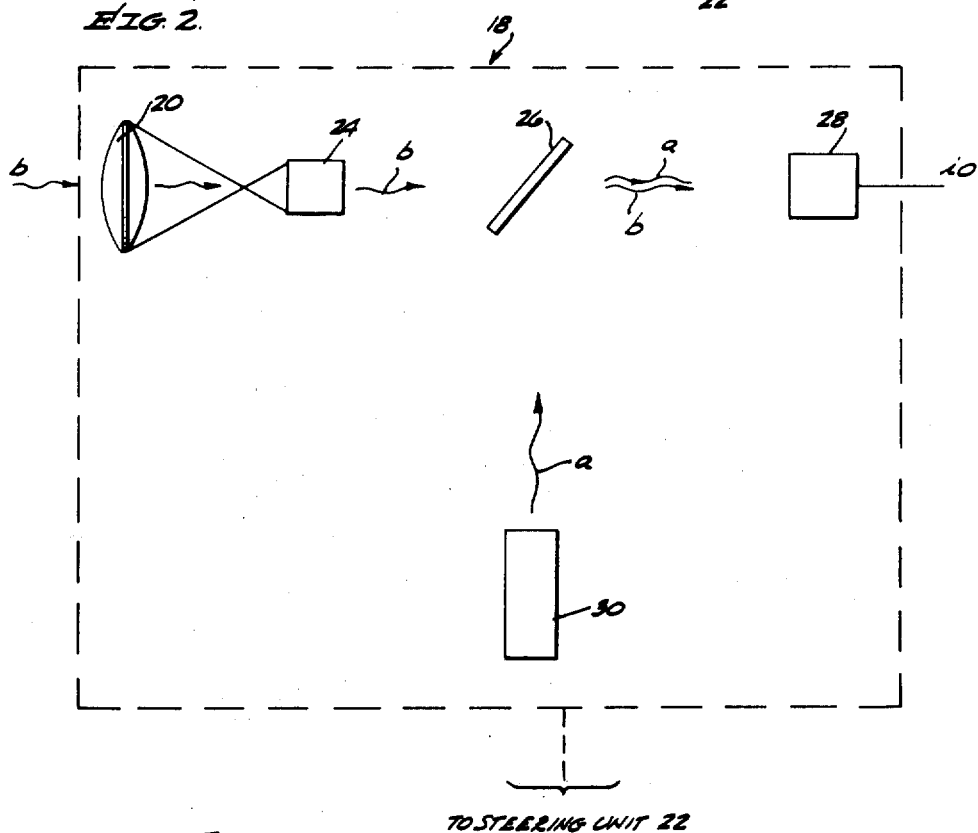
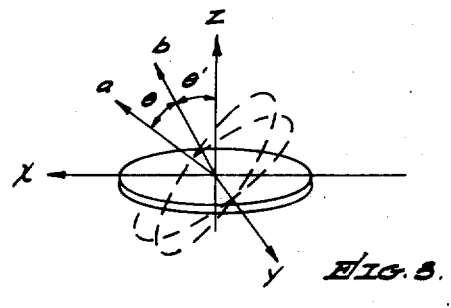
INVENTORS.
KENNETH L. BRINKMAN,
EUGENE F. GRANT,
EMMANUEL J. VOURGOURAKIS,
BY
Robert Thompson
ATTORNEY.

$$x = \frac{\pi D}{\lambda_b} \theta$$

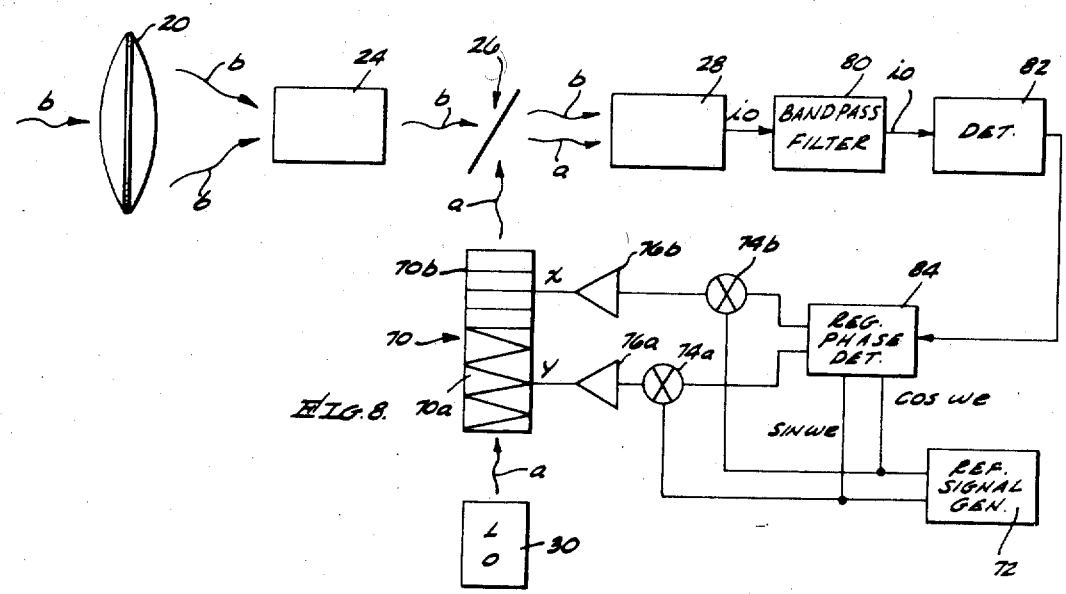
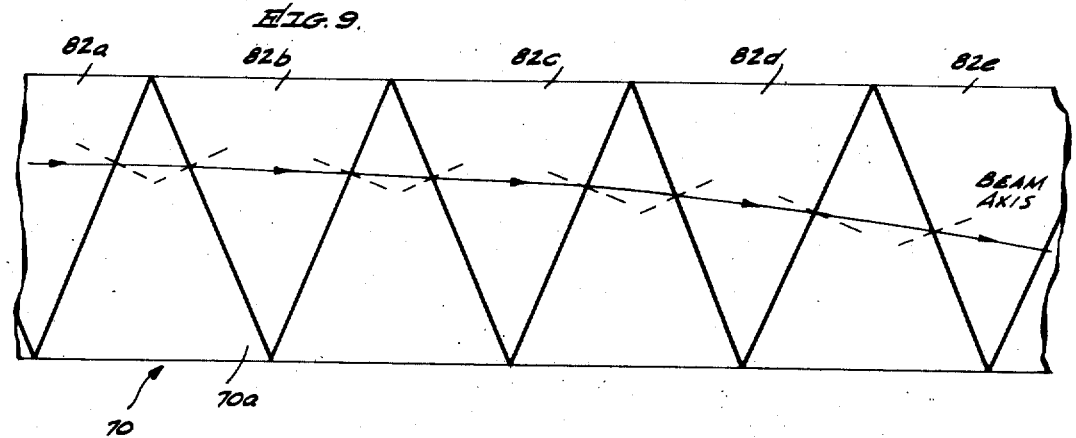

United States Patent Office
3,497,697
Patented Feb. 24, 1970

3,497,697
LOCAL OSCILLATOR REFERENCE TRACKING SYSTEM (LORTS)
Kenneth L. Brinkman, Palos Verdes Peninsula, and Eugene F. Grant and Emmanuel J. Vourgourakis, Santa Monica, Calif., assignors to Hughes Aircraft Company, Culver City, Calif., a corporation of Delaware
Filed Nov. 1, 1967, Ser. No. 679,710
Int. Cl. G01j 1/20; G01b 11/26; H01s 3/00
U.S. Cl. 250—203                     5 Claims

ABSTRACT OF THE DISCLOSURE

A laser tracking system including high resolution entrance optics adapted to receive a laser beam and which is coupled to a coarse adjusting means; a local oscillator reference laser; a half-reflecting mirror operable to transmit one of the laser beams and to reflect the other laser beam into coarse parallel alignment of their propagation axes; and adjustable means which, in response to the amplitude and phase of an I-F signal produced by heterodyning the two beams, is operable to deflect the beams into nearly parallel alignment for maximizing the amplitude of the heterodyned signal.

---

This invention relates generally to tracking systems and particularly to a means for providing alignment of an optical receiver with a beam of spatially coherent and temporally coherent laser energy.

Because of the temporal coherence and spatial coherence of laser energy and the short wave lengths, certain critical requirements exist that are not necessarily found in radio and microwave communication. For example, it is desirable to maintain precise alignment of an optical receiver antenna such as a telescope with a beam of coherent laser energy received. This is especially true for optical heterodyne reception where sensitivity is considerably enhanced by precise local oscillator (l.o.) alignment with the received beam. Of more general applicability, when transmitting over extraordinarily long distances where extremely narrow beam widths (high gain) are required, unusually precise pointing and tracking is required both for establishing the transmitter pointing direction and for limiting the field of view of the telescope to as small an angle as is reasonably possible. Ideally, the telescope aperture should be no larger than that subtended by the coherence area of the source radiation.

Normally, in aligning the receiver with the transmitter, a coarse alignment can be done mechanically. The last few radial increments of fine alignment necessary to make the receiver tracking compatible with the narrow beam of transmitted laser energy cannot often be realized by conventional mechanical means.

Accordingly, it is an object of this invention to provide means for attaining precise alignments of an optical receiver with a beam of laser energy being received.

Another object is to provide means and methods of achieving ultra-high accuracy pointing and tracking of a laser beam which can have the advantages of providing extremely high directivity-gain of optical apertures.

Still another object is to provide a means for increasing the signal-to-noise ratio of a received laser beam of the type carrying information.

Yet another object is to provide a means for optically aligning a local oscillator reference laser beam with a received beam of laser energy for heterodyne reception and for optimizing the sensitvity of an optical heterodyne receiver to a beam of laser energy.

The above and other objectives can be attained by providing a means for receiving a narrow beam of laser energy including a receiver comprising high resolution entrance optics adapted to be coarse-aligned with the axis of the beam of laser energy. The received laser energy is collimated and directed to a radiation detector through one side of a half-reflecting mirror. In addition, a local oscillator reference in the form of a beam of laser energy at a slightly different frequqency than the frequency of the incoming laser energy is directed through an electro-optical steering unit and reflected from the other side of the half-reflecting mirror to the radiation detector. The two laser beams create interfering waves on the face of the radiation detector, resulting in an A-C output component from the radiation detector, at a frequency equal to the difference frequency of the two lasers being used.

The amplitude of the A-C signal is dependent upon the angle $\theta$ between the axes formed by the direction of propagation of the incoming laser energy and the direction of propagation of the local oscillator laser beam. In principle, when the beams are perfectly coaxially aligned at the detector, the A-C component produced at the output of the photodetector is maximized; conversely, the amplitude of the A-C component is diminished as the angle $\theta$ increases. The system attempts to maximize the amplitude of this A-C component by measuring this A-C component and using this measurement signal to control the receiver telescope axis and/or to drive the electro-optical steering unit. The local oscillator reference laser beam is nutated in a pattern which describes a cone about a reflected axis substantially perpendicular to the surface of the radiation detector. The magnitude and the phase of the resulting fluctuation in the A-C component are characteristic of the direction of the local oscillator reference beam and are used in control signals to direct control drives for the electro-optic steering unit so as to bring the receiver system into alignment with the incoming laser beam. When the system is substantially aligned, the angle $\theta$ is significantly reduced, whereupon the amplitude of the A-C component of the photo detector no longer fluctuates and is maximized.

Other objects, features and advantages of this invention will become apparent upon reading the detailed description of several embodiments and referring to the accompanying drawings in which:

FIGURE 1 is a block diagram illustrating the relationship of a transmitter and a receiver;

FIG. 2 is a schematic diagram of the receiver portion which heterodynes an incoming coherent radiation signal with a local oscillator coherent radiation signal.

FIG. 3 is a schematic illustration in perspective, showing the relationship of the angles and wavefronts (greatly exaggerated) of the beams of coherent radiation;

FIG. 8 is a schematic diagram of a preferred embodiment wherein the beam steering is done by an electro-optical unit; and FIG. 9 is a side view of a crystal arrangement used for the electro-optical steering unit.

Figure 4:
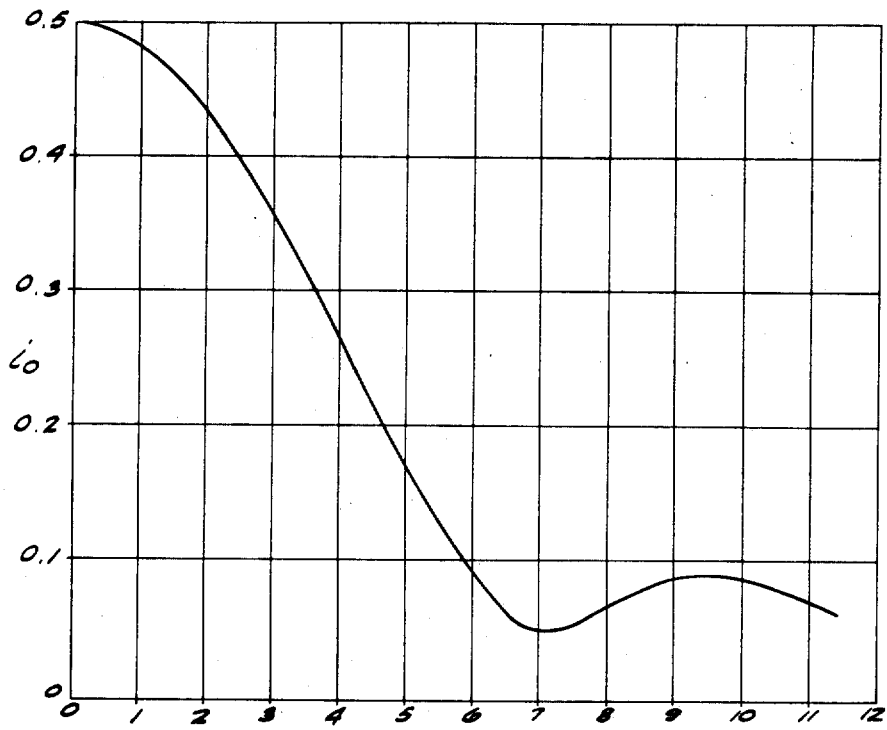
FIG. 4 is a graph, illustrating the relationship of the amplitude of the heterodyne signal versus the angle $\theta$ between the two beams of coherent radiation.
Figure 5:
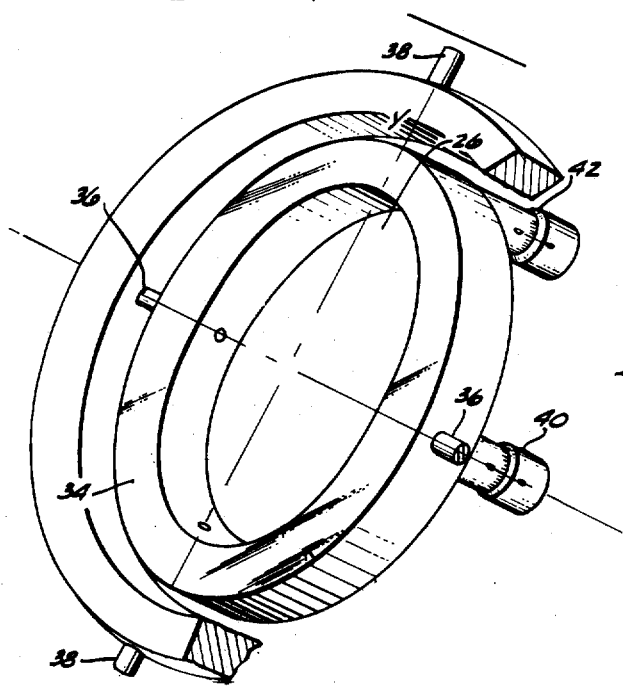
FIG. 5 is a perspective drawing showing one possible means for mechanically adjusting a half-reflecting mirror in the receiver for minimizing the angle $\theta$ between the two beams of coherent radiation.

Referring now to the operation of the system illustrated in FIG. 1, a transmitter 14 located at a distance from a receiver 16 transmits a narrow beam of spatially coherent and temporally coherent energy toward the receiver. One way that the beam of coherent energy can be generated is with a laser means in which the beam can be modulated with an information signal before transmissions. Where the distance between the transmitter and receiver is very long, the diameter of the beam is, by necessity, made extremely narrow and, in fact, can be on the order of microradians.

Because of the spatial coherence, the temporal coherence and the high frequency of the laser beam, certain critical requirements exist which must be met by the receiver 16 before the information on the beam of coherent energy can be properly demodulated. For example, it is necessary for the beam of coherent energy to be heterodyned with a compatible local oscillator reference, such as another beam of coherent energy, having a frequency slightly different than the frequency of the received coherent energy. In addition, the sensitivity of the receiver must be optimized by orienting the local oscillator reference beam of coherent energy into a coaxial alignment with the received beam of coherent energy.

Referring now to the receiver 16 in more detail, the receiver laser beam is directed through receiver optics 18. The receiver optics 18 include a high resolution entrance optic lens 20 having an aperture no more than the coherence area of the incoming energy.

The receiver optics is mechanically steered by a steering unit 22 in a conventional manner to attain a coarse optical alignment of the receiver optics 18 with the axis of the beam of received laser energy. One circuit technique that could be utilized for the steering unit 22 to perform the coarse alignment is the servo and resolver feedback systems disclosed in U.S. Patent No. 3,080,484 issued Mar. 5, 1963, and entitled. "Electro-optic Light-Detecting Apparatus," and U.S. Patent No. 3,165,632 issued Jan. 12, 1965, and entitled, "Steer-tracking System Using a Frequency Modulated Carrier Wave."

The receiver optics, as illustrated in FIG. 2, further include a collimator 24 which receives the radiation from the entrance lens 20 and collimates it. The collimated beam is directed through a beam splitter such as a half-reflecting mirror 26 inclined at a 45° angle thereto, to a radiation detector 28 which can have an optically flat detector surface. The collimated beam of laser energy, transmitted through the half-reflecting mirror impinges upon the flat surface of the radiation detector 28 from an angle that is about normal to the plane of the radiation detector or as near as is possible with the coarse tracking and resolving capabilities of the steering unit 22.

The last few microradians of resolution are, however, usually beyond the capabilities of mechanical steering unit 22. Since the only limitation on the angle of incidence is that the wave front of the incoming energy beam $b$ should not impinge upon the surface of the radiation detector at an angle larger than the associated field of view, this coarse optical alignment of the entrance optics 18 is sufficient to initiate the fine alignment.

In addition to the incoming laser beam $b$, a local oscillator laser 30 generates a local oscillator reference beam $a$ having a frequency slightly different than the frequency of the incoming laser beam $b$. This local oscillator reference beam $a$ is reflected from the other side of the half-reflecting mirror 26 to the surface of the radiation detector 28. Ideally, the reflected local oscillator reference beam $a$ should be coaxial with or parallel to the incoming laser beam $b$ so that the wave fronts of the two beams impinge upon the surface of the radiation detector 28 at the same angle. When this operating condition occurs, the amplitude of the A-C component of the output signal $i_o$ from the radiation detector 28 is maximized.

To explain this relationship, reference is made to FIG. 3 wherein the wave fronts of the incoming laser beam $b$ and the local oscillator laser beam $a$ are shown impinging upon the surface of radiation detector 28 at arbitrarily selected angles which, for descriptive purposes, are illustrated as greatly exaggerated. In effect, the amplitude of the A-C component of the output signal from the radiation detector 28 varies in accordance with an arithmetic function of the angle $\theta$ between the two beams and of the geometrical shape of the detector aperture. For example, if the detector is circular such as illustrated in FIG. 3, having a diameter D no greater than the coherence area of the wave front, the amplitude of the A-C component of the detector output signal $i_o$ will vary in proportion with the function:

$$\left[\left(\frac{J_1(x)}{x}\right)^2 + \left(\frac{\Omega_1(x) + \frac{2}{\pi}}{x}\right)^2\right]^{1/2}$$

where:
$J_1(x)$ = Bessel function of 1st kind and 1st order;
$\Omega_1(x)$ = Weber-Lommell function of 1st order;

$$x = \frac{\pi D \theta}{\lambda_b}$$

$\lambda_b$ = the wavelength of the incoming laser beam $b$;
D = the beam diameter;
$\theta$ = the angle between the reflected local oscillator reference beam $a$ and incoming beam $b$.

This function is graphically illustrated in FIG. 4 wherein amplitude of the A-C component of the signal $i_o$ is represented along the ordinate and the angle $x$ is represented along the abscissa in the same units as the angle $\theta$.

One manner of fine adjustment in which the local oscillator reference beam $a$ and the received laser beam $b$ are brought into parallel alignment is by tilting or deflecting the plane of the half-reflecting mirror 26. A structure which will enable the half-reflecting mirror 26 to be deflected includes a mounting ring 34 which is supported for movement about two intersections or orthogonal axes hereinafter referred to as the $x$-axis and the $y$-axis. At one end of each axis, the mounting ring 34 is pivotally supported by members 36 and 38, and is connected to be deflected transversely relative to the orthogonal axis in the direction of the optical axis by means of differential screw adjusting means 40 and 42 such as the type described in "Ingenious Mechanisms for Designers and Inventors," vol. III, edited by Hallbrook H. Horton, Second Printing 1952, published by the Industrial Press, New York, N.Y., p. 503. In operation, one of the differential screw means 40 or 42 is turned in the direction that tends to maximize the level of the heterodyne signal output $i_o$ from the detector 28 (FIG. 2). After the signal $i_o$ is maximized relative to one axis, the half-reflecting mirror is axially deflected transverse to the other orthogonal axis in the direction of the optical axis by means of the other differential screw mechanism 42 or 40 until the output signal from the detector 28 is further maximized. Thereafter, additional adjustments along the axes can be made, if desired, until no further increase in the signal $i_o$ can be obtained. Of course, for many applications, it is desirable to provide means for performing this adjustment automatically.

Figure 6:
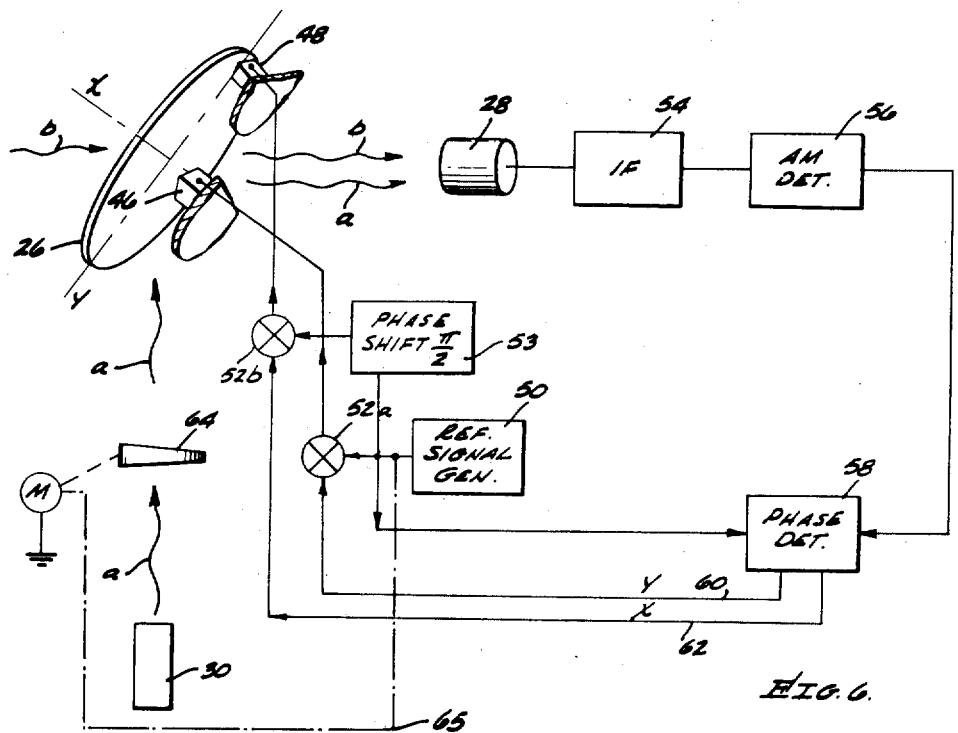
FIG. 6 is a schematic diagram, partly in perspective, of a device for deflecting one of the beams of coherent radiation for minimizing the angle $\theta$ between the two beams by means of piezoelectric transducers.

One automatic tracking system is illustrated in FIG. 6, wherein the half-reflecting mirror 26 is deflected or tilted at the two orthogonal axes by means of piezoelectric transducers 46 and 48, respectively. In operation, the incoming beam of coherent radiation $b$ is directed through one side of the inclined half-reflecting mirror 26 and the local oscillator reference beam $a$ is reflected from the other side. With a coarse alignment, both beams impinge upon the detector 28 in nearly parallel relationship. The two nearly parallel beams are heterodyned by the detector 28 into an output signal $i_o$ which contains an I–F component having an amplitude proportional to:

$$\left[\left(\frac{J_1(x)}{x}\right)^2 + \left(\frac{\Omega_1(x) + \frac{2}{\pi}}{x}\right)^2\right]^{1/2}$$

where $$x = \frac{\pi D \theta}{\lambda_b}$$

Structurally, one dector that can be used is an In–As detector. In addition, in the local oscillator laser 30 can be an HeNe laser or a xenon laser of the type referenced on pp. 60 and 61 of Applied Physics Letters, vol. VIII, No. 3 dated Feb. 1, 1966.

In order to determine the angle $\theta$, the half-reflecting mirror 26 is precessed, thereby impressing an A-C component on the output I–F signal $i_o$ from the detector 28. The A-C component has a phase and amplitude related to the precessed angle $\theta$. In operation, the half-reflecting mirror 26 is precessed by a reference signal generator 50 which generates a 1 kHz. sinusoidal output signal that is fed through summing circuits 52a to one of the piezoelectric transducers 46 mounted to support the half-reflecting mirror along one of the orthogonal axes of deflection. In addition, the 1 kHz. output signal is fed through a phase shift 53, shifted in phase 90° and then fed through the summing circuit 52b to the other piezoelectric transducer 48. The 1 kHz. electrical signal applied thereto causes the dimensions of the piezoelectric material to change, resulting in a corresponding change in the inclination angle of the half-reflecting mirror. This continuous change in the inclination angle results in the A-C component being developed on the heterodyned output signal $i_o$.

To determine the angle $\theta$ from the A-C component of output signal $i_o$, an I-F detector 54 receives the output signal $i_o$ from the radiation detector 28 producing an I-F signal which is fed to an amplitude modulation detector 56, which in turn produces an A-C output signal that is phase-related to the angle $\theta$. Circuits that could be used for the I-F detector 54 and the amplitude modulation detector 56 are disclosed in Proceeedings of the IRE, Waves and Electron Section, August 1949, pp. 943–951, in an article entitled, "An Analysis of the Sensing Method of Automatic Frequency Control and Microwave Oscillators" by E. F. Grant, wherein the I-F detector 54 can include a cavity resonator tuned to the desired heterodyne frequency and the amplitude modulation detector 56 can be the envelope detector.

The phase of the A-M output signal is detected by a phase detector 58. The phase detector 58 is coupled to receive the output signal from the amplitude modulation detector 56 and to receive the 1 kHz. reference signal from the reference signal generator 50. Since the A-M signal was generated as a result of the 1 kHz. signal dithering the half-reflecting mirror 26, both of the received signals are the same frequency (1 kHz.), and the phase detector 58 detects the phase difference therebetween resulting from the angle of inclination of the half-reflecting mirror 26 and generates two D-C error output signals, "$x$" and "$y$," which are in relative phase quadrature with one another. One of these D-C error signals is utilized to control the $x$-axis deflection of the half-reflecting mirror 26 and the other D-C error signal controls the $y$-axis deflection. As a result, the inclination angle of the half-reflecting mirror 26 can be changed or tilted in the direction that tends to decrease the angle $\theta$ toward 0°. When the angle $\theta=0°$, the two input signals to the phase detector 58 will be substantially in phase, whereupon the levels of the D-C error signals remain constant.

More specifically, to control the $y$-axis deflection, the D-C error signal "$y$" on line 60 is fed through the summing circuit 52a to the piezoelectric transducer 46, causing an appropriate shrinkage or expansion of the piezoelectric material. This change in the bias dimension of the piezoelectric material causes the half-reflecting mirror 26 to deflect slightly about the $y$-axis. In addition, the half-reflecting mirror 26 is deflected or tilted about the $x$-axis by the D-C error signal "$x$" on the line 62 fed through summing circuit 52b to the piezoelectric transducer 48, thereby changing its bias dimension. Thus, in response to the phase difference between the two input signals received by the phase detector 58, the amplitude and polarity of the D-C error signal on line 62 will cause the piezoelectric material of the transducer 48 to expand or contract, thereby deflecting the attached mirror or tilting it about the $x$-axis.

Figure 7:
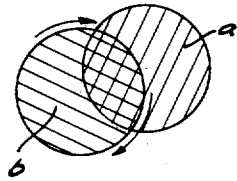
FIG. 7 is a schematic illustration showing the relationship of a nutated local oscillator reference beam $a$ relative to the incoming beam $b$ to generate an A-C steering signal.

In another means of implementation, the coherent beam $a$ from the local oscillator laser 30 is directed through a rotating prism 64 which refracts it slightly so that it is nutated and generates a cone of revolution with the apex thereof at the prism 64 and the base thereof at the half-reflecting mirror 26. The prism 64 is rotated by a motor which is controlled by the reference signal generator over line 65. The local oscillator reference beam $a$ is refracted sufficiently so that its cross-sectional area overlaps the cross-sectional area of the incoming laser beam $b$ in the manner illustrated schematically in FIG. 7. Thus, if the two beams are generally centered, then as the local oscillator reference beam $a$ is nutated in the direction of the arrow, since the angle of refraction is constant, the ratio of area overlap remains constant throughout the entire nutation cycle, whereupon the resulting signal produced by detector 28 will have a constant amplitude. If, however, the two beams are not centered, the area overlap between the two beams varies during a full nutation cycle, thereby producing a variable amplitude output signal having a frequency equal to the nutation frequency and a phase related to the direction of off center.

In another embodiment, illustrated in FIG. 8, the fine adjustment can be accomplished with an electro-optical steering unit 70. As in the preceding embodiments, the incoming beam of coherent radiation $b$ is directed through the high resolution entrance optics 20, the collimator 24, through the inclined half-reflecting mirror 26 as a received radiation beam $b$, and to the surface of the radiation detector 28. The reference beam $a$ from the local oscillator laser 30 is directed through an electro-optical steering unit 70 to one side of the inclined half-reflecting mirror 26, from where it is reflected to the radiation detector 28 in nearly parallel alignment with the incoming radiation beam $b$. The angle $\theta$ between the two nearly parallel beams $a$ and $b$ results in an A-C component being impressed on the heterodyned output signal $i_o$ of the radiation detector 28 when the local oscillator reference beam $a$ is nutated by the electro-optical steering unit 70.

In order to nutate or dither the local oscillator reference beam $a$, electrical signals generated by a reference signal generator 72 are fed through summing circuits 74a and 74b and voltage amplifiers 76a and 76b to drive the electro-optical steering unit 70. At the electro-optical steering unit 70, the drive signals develop electrical fields which deflect the local oscillator reference beam $a$ into a precession cone pattern. The precession cone pattern results in the A-C modulation being impressed on the I-F output signal $i_o$ of the radiation detector 28.

The axis of the local oscillator beam $a$ precession cone is directed to become collimar or parallel to the incoming beam $b$ axis. This precession cone is generated by the electro-optical steering unit 70 by means of the drive signals in phase-quadrature, the magnitude of which determines the minimum offset cone angle, $\theta_o$. Thus when the axis of this cone of precession is parallel to the incoming (received) wave $b$ direction, the amplitude of the output (I–F) signal is a constant determined by this angle $\theta_o$.

When the angle between this cone axis and the incoming radiation beam $b$ is greater than zero (but within the field of view limits provided by the coarse tracker and taken to be also within the 1st Airy Disk of the defining aperture), the I–F signal $i_o$ is modulated by the relative spatial motion of the two beams. This modulation frequency is an envelope (a subcarrier) modulation at the frequency of precession of the local oscillator beam. The function of the processing circuitry which follows is to bring to zero (or minimize) this modulation so that only a D-C signal of a magnitude equal to that determined by the offset angle $\theta_o$ remains. At this point, the local oscillator precession axis and the incoming signal are perfectly aligned.

The fine steering signal is produced from the A-C component when the I–F signal $i_o$ is fed through a band-pass filter 80 to a detector or rectifier 82 to generate an amplitude-modulated envelope signal having a phase which is related to the orientation of the incoming radiation $b$ where the amplitude is proportional to the angle $\theta$. This amplitude-modulated signal is fed to a regulator 84.

The regulator 84 detects the phase difference between the output signal received from the reference signal generator 72 and the amplitude-modulated signal from the detector 82. Since the frequency of these two signals is the same, two D-C output error signals, $x$ and $y$, are generated by the regulator 84. Their magnitude is proportional to the depth of modulation. Moreover, the one is proportional to the sine of the phase difference angle between the received signals, while the other is proportional to the cosine of the same angle. The D-C error signals are fed through the voltage amplifiers 76a and 76b and are applied to drive the electro-optical steering unit 70 for respectively deflecting the local oscillator beam $a$ in the $x$-direction or the $y$-direction that tends to minimize the angle $\theta$ between the two beams.

Referring now to the details of the electro-optical steering unit 70, reference is made to FIG. 9, wherein one of the electro-optical steering units 70a is illustrated. This electro-optical steering unit 70a includes a plurality of prisms 82a, 82b, 82c, etc., made of optical material such as KDP or KD*P, and arranged with their $c$-axes parallel but oriented alternatively in opposite directions. For example, in FIG. 9, the $c$-axes would be directed alternately into and out of the plane of the paper.

To determine a maximum deflection $\theta_{max}$, $$\theta = \frac{2\delta}{x}$$

where:
L=total length of the electro-optical steering unit
h=diameter
$\delta$=change in the refractive index of a prism induced by the electro-optical effect for a KD*P prism.

$$\delta = 3 \times 10^{-7} \times \frac{e}{t - t_c}$$

where:
$e$=electric field in volts $x$ cm.$^{-1}$
$t$=operating temperature
$t_c$=Curie temperature It should be noted that the diameter of the electro-optical steering unit 70 is chosen so that, at a maximum deflection angle $\theta_{max}$, the total laser beam is still within the boundaries of the deflector's exit surface. In other words, $$h \geq D = 2L\theta$$

where:
$h$=diameter of the electro-optical steering unit
D=diameter of the laser beam
L=the length of the electro-optical steering unit
$\theta$=deflection angle Assuming that the electro-optical unit 70, illustrated in FIG. 9, is utilized to deflect the local oscillator beam $a$ along one orthogonal axis such as an arbitrarily selected $x$-axis, a second substantially identical electro-optical steering unit 70b (FIG. 8) is needed to deflect the beam in the direction of the $y$-axis. To achieve the $y$-axis deflection, the second electro-optical steering unit is placed in longitudinal coaxial alignment with the first electro-optical steering units with the $c$-axis of the prisms being rotated 90° about the longitudinal axis relative to the $c$-axis of the prisms in electro-optical steering unit 70a. Thus the two electro-optical steering units will together provide the $x$-deflection and $y$-deflection for nutation and for fine alignment of the local oscillator laser beam $a$ with the incoming laser beam $b$.

While the salient features have been illustrated and described with respect to a particular embodiment, it should be readily apparent that modifications can be made within the spirit and scope of the invention, and it is therefore not desired to limit the invention to the exact details shown and described.

What is claimed is:

1. A device for tracking a spatially and temporally coherent incoming radiation beam comprising:

high resolution entrance optics means having an aperture no greater than the coherent area of the incoming radiation;

radiation detector means disposed along the optical axis of said entrance optics means;

beam splitter means positioned along the optical axis between said entrance optics means and said detector means for transmitting the incoming radiation beam through one side thereof to said detector means;

steering means coupled to steer said entrance optics means said radiation detection means and said beam splitter means into substantial optical axial alignment with the axis of the spatially coherent and temporally coherent incoming radiation beam;

local oscillator signal generator means for producing a local oscillator beam of spatially and temporally coherent radiation having a frequency different than the frequency of the incoming radiation beam, the local oscillator beam being operably reflected from the other side of the beam splitter to said detector means for producing an I-F signal when the wavefronts of the incoming radiation beam and the local oscillator beam are substantially parallel;

deflector means for deflecting the local oscillator beam;

reference signal generator means coupled to said deflector means for deflecting the local oscillator beam in accordance with the reference signal for impressing an AC component on the I-F signal having a phase and amplitude related to the angle and orientation that the wavefronts of the two radiation beams lack being parallel; and means responsive to the AC signal coupled to said deflector means for deflecting the local oscillator beam in a direction that minimizes the AC phase component of the error signal to minimize the angle between the two beams.

2. The combination of claim 1 in which said deflector means for deflecting the local oscillator reference beam of radiation includes means for tilting the plane of said half-reflecting mirror along at least one axis.

3. In the combination of claim 1, said deflector means for deflecting the local oscillator reference beam of radiation including means for tilting the plane of said half-reflecting mirror along two intersecting axes.

4. The combination of claim 1, in which said deflector means for deflecting the local oscillator reference beam of radiation includes means for tilting the plane of said half-reflecting mirror along two orthogonal axes.

5. The combination of claim 1 in which said deflector means for deflecting the local oscillator reference beam of radiation includes an optical crystal positioned to transmit the local oscillator reference beam between said means for generating the local oscillator beam and said beam splitter means for directing the local oscillator reference beam into substantially parallel alignment with the received beam and for deflecting the local oscillator reference beam transmitted therethrough in response to an electrical field applied transversely thereacross.

References Cited

UNITED STATES PATENTS

| | | | |
|---|---|---|---|
| 2,577,807 | 12/1951 | Pryor | 356—153 |
| 3,343,445 | 9/1967 | Norman | 350—203 X |

OTHER REFERENCES

"Frequency Characteristics of a Continuous-Wave He-Ne Optical Maser," by A. Javan, E. A. Ballik and W. L. Bond, Journal of Optical Society of America, pages 96, 97 and 98, vol. 52, No. 1, January 1962. Copy in Art Unit 257.

JAMES W. LAWRENCE, Primary Examiner

C. R. CAMPBELL, Assistant Examiner

U.S. Cl. X.R.

250—204; 331—94.5; 356—152, 153